(12) United States Patent
Peterson

(10) Patent No.: US 8,654,322 B2
(45) Date of Patent: Feb. 18, 2014

(54) APPARATUS AND METHOD FOR MEASURING THE AIM LOCATION OF VEHICLE HEADLAMPS

(75) Inventor: Kurt Peterson, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 2018 days.

(21) Appl. No.: 11/127,549

(22) Filed: May 12, 2005

(65) Prior Publication Data

US 2006/0256320 A1 Nov. 16, 2006

(51) Int. Cl.
*G01J 1/06* (2006.01)

(52) U.S. Cl.
USPC .......................................................... 356/121

(58) Field of Classification Search
USPC .......................................................... 356/121
See application file for complete search history.

(56) References Cited

U.S. PATENT DOCUMENTS

| | | | |
|---|---|---|---|
| 3,467,473 A | 9/1969 | Preston | |
| 3,791,740 A | 2/1974 | Proefrock | |
| 4,134,680 A * | 1/1979 | Hunter et al. | 356/121 |
| 4,634,275 A | 1/1987 | Yoshida et al. | |
| 4,970,403 A * | 11/1990 | Krasutsky | 250/216 |
| 5,078,490 A | 1/1992 | Oldweiler et al. | |
| 5,164,785 A * | 11/1992 | Hopkins et al. | 356/121 |
| 5,318,172 A * | 6/1994 | Kenny et al. | 209/524 |
| 5,321,439 A | 6/1994 | Rogers | |
| 5,373,357 A | 12/1994 | Hopkins et al. | |
| 5,379,104 A | 1/1995 | Takao | |
| 5,485,265 A | 1/1996 | Hopkins | |
| 5,751,832 A * | 5/1998 | Panter et al. | 382/104 |
| 5,796,522 A * | 8/1998 | Meyers | 359/626 |
| 5,818,571 A * | 10/1998 | Prettyjohns et al. | 356/121 |
| 5,861,628 A * | 1/1999 | Genna et al. | 250/368 |
| 2002/0167657 A1 | 11/2002 | Tomasz | |
| 2004/0263847 A1 * | 12/2004 | Merle et al. | 356/402 |
| 2006/0055811 A1 * | 3/2006 | Frtiz et al. | 348/340 |

\* cited by examiner

*Primary Examiner* — Gregory J Toatley
*Assistant Examiner* — Rebecca C Bryant
(74) *Attorney, Agent, or Firm* — Raymond L. Coppiellie; Tung & Associates

(57) ABSTRACT

An apparatus and method for measuring the aim of vehicle headlamps including measuring the light intensity of a light beam emitted by a vehicle headlamp to check the aim of the vehicle headlamp. The apparatus includes a linear photosensitive array having a plurality of individual photo sensors positioned between a plurality of baffles. The array is movably mounted to a frame whereby it can be positioned at predetermined locations to measure light beam intensity and correspondingly determine the beam pattern and aim point of a headlamp.

17 Claims, 3 Drawing Sheets

APPARATUS AND METHOD FOR MEASURING THE AIM LOCATION OF VEHICLE HEADLAMPS

CROSS-REFERENCE TO RELATED APPLICATIONS

Not Applicable.

BACKGROUND OF THE INVENTION

1. Field of the Invention

The present invention relates generally to an apparatus and method for measuring the aim of vehicle headlamps; and, more specifically, for measuring the light intensity to check the aim of a vehicle headlamp.

2. Description of Related Art

Vehicle headlamps illuminate the roadway in front of a vehicle. Designed to project light over the roadway in a particular pattern headlamps must be aimed according to certain preset standards. Modern automotive vehicle manufacturers use a variety of headlamp designs that are placed on a variety of vehicles. Each headlamp design has a different aim specification and tolerance; therefore, each headlamp should be checked to ensure it meets proscribed standards. Typically, the headlamp manufacturer controls the headlamp pattern or optical prescription. Thus, the vehicle manufacturer properly aims the headlamp by aligning the headlamp on the vehicle.

One method of checking headlamp aim is to direct the headlamp at a screen assembly and compare the illumination pattern with a pre-established proper alignment pattern for a particular headlamp located on a specific vehicle. This comparison method requires a plurality of pre-established standards, one for each type of headlamp and vehicle. An additional problem with comparison type systems is that it is sometimes difficult to determine what part of the optical prescription is being compared. Comparison systems are often limited to detecting hot spots and not recording or analyzing data, specifically light intensity over the entire area of illumination. Accordingly, it is desirable to have an apparatus that can obtain and record objective data, including light intensity, for a multitude of headlamp types, styles and designs while at the same time having the flexibility and capability to aim and audit a variety of headlamps.

SUMMARY OF THE INVENTION

Accordingly, the present invention is an apparatus and method for checking the aim of vehicle headlamps. The apparatus includes a board or panel having a track or rail system mounted on an edge thereof. An array of photo sensors mounted adjacent to the board or panel travel from one end of the panel to the other. The array includes a plurality of individual photo sensors positioned between a plurality of baffles. A control unit connected to the array records the light readings received from the photo sensors at various portions or positions on the board or panel. Thus, an accurate determination of the amount of light energy or light intensity, along with the orientation or direction of aim, of a headlamp illuminating the board or panel is possible. Accordingly, the device has the flexibility and capability to aim and audit a headlamp.

The present invention further includes a method for checking the aim of a headlamp, including determining if the headlamp is properly positioned on the vehicle. The method includes providing a board or panel at a preset distance from the vehicle headlamp. Once properly positioned, the vehicle headlamp illuminates the board or panel. An array including a plurality of photo sensors positioned between a plurality of baffles is positioned adjacent the board or panel. Positioning the array at various points along the board or panel and measuring the light intensity provides information used to determine the beam pattern and aim point of the headlamp. In a further embodiment, the array travels across or over the board in a scanning procedure or method to obtain a complete scan and correspondingly measure the overall light intensity of the headlamp. Using the array in such a manner provides a complete picture of the headlamp illumination pattern or optical prescription. Finally, the light intensity data obtained by the array is transmitted to a control unit that transfers light intensity information to a view screen on the control unit for review and analysis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
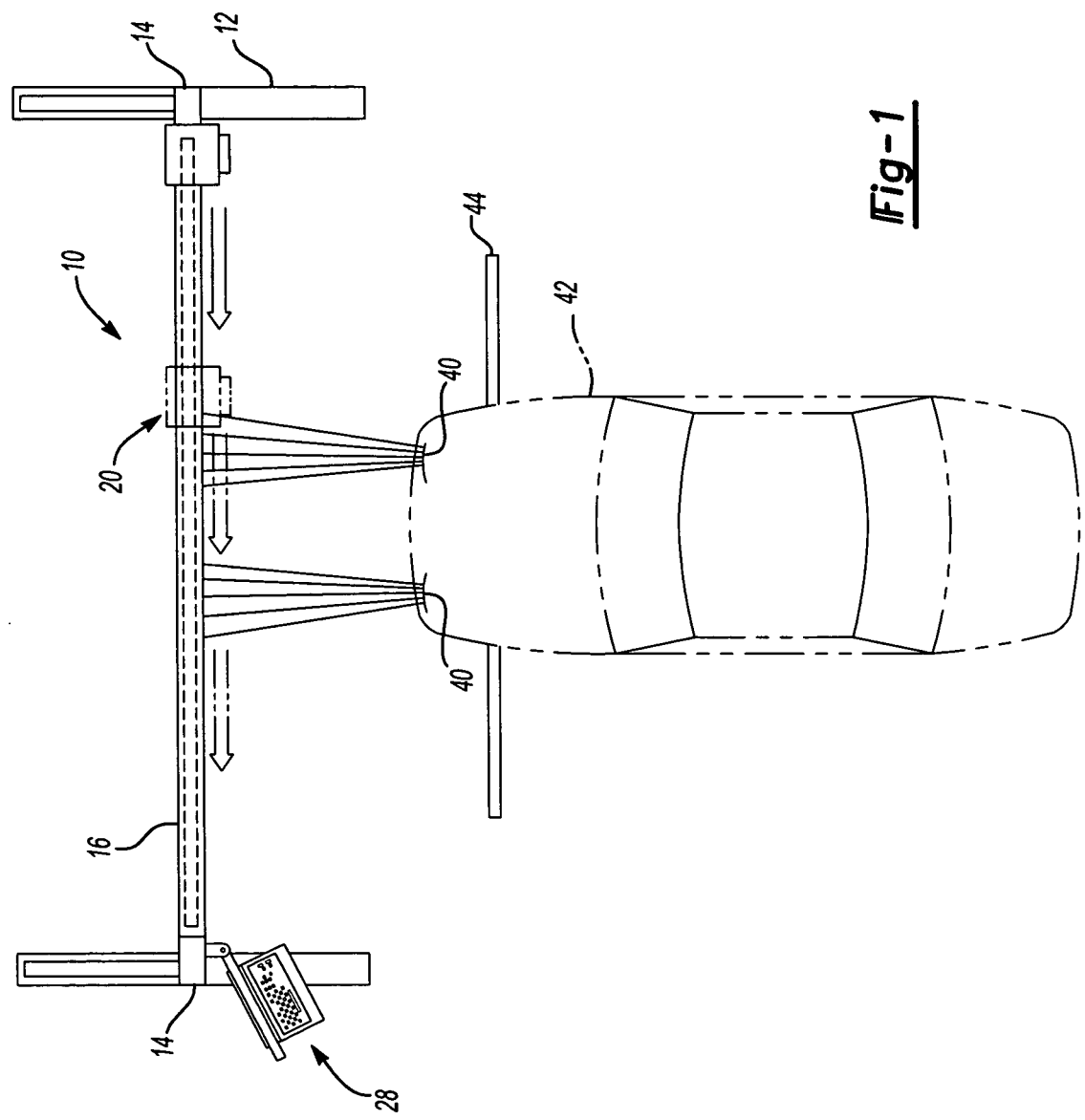
FIG. 1 is a plan view of an apparatus for checking the aim of vehicle headlamps according to the present invention.
Figure 2:
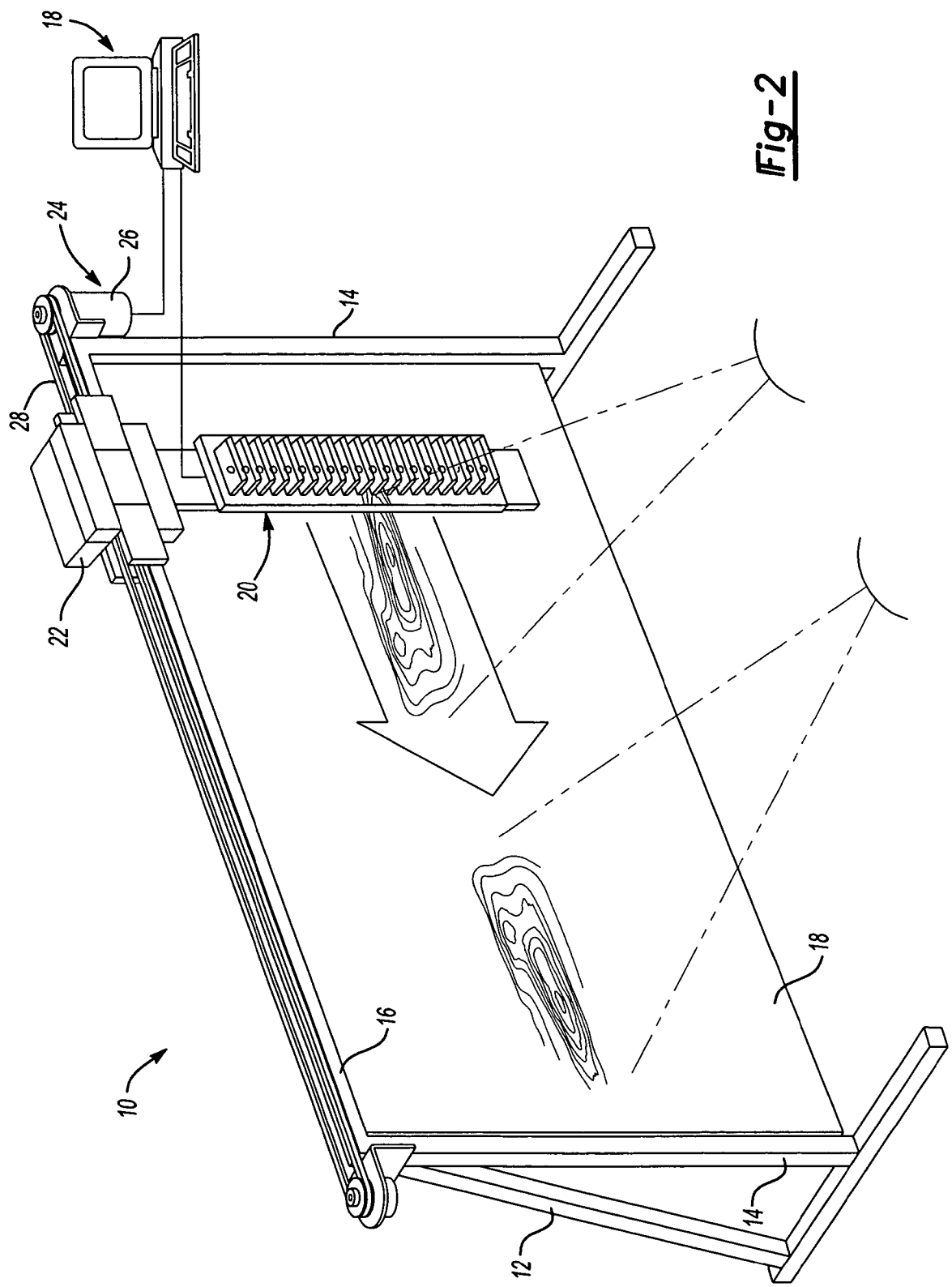
FIG. 2 is a perspective view of the apparatus for checking the aim of vehicle headlamps of FIG. 1.

Referring now to the drawings, FIGS. 1-2 illustrate a headlamp aiming apparatus, seen generally at 10, constructed in accordance with a preferred embodiment of the present invention. The headlamp aiming apparatus 10 generally includes a frame 12 having a pair of upstanding leg members 14 connected to a crossbar 16. A headlamp aiming board 18 is secured to the frame 12. A photosensitive array, seen generally at 20, is movably supported on the crossbar 16. As shown, a guide member 22 mounts the photosensitive array 20 to the crossbar 16 whereby the photosensitive array 20 moves back and forth on the crossbar 16. A servo drive mechanism, seen generally at 24, connects to and is operative to move the guide member 22 and correspondingly the photosensitive array 20 to various locations or positions on the crossbar 16. The servo drive mechanism 24 includes a drive motor 26 and a drive member, shown herein as a drive belt 28. Other types of drive mechanisms, such as a chain drive mechanism, ball and screw assembly or any other type of drive mechanism are suitable provided they accurately position the photosensitive array 20 on the crossbar 16.

A control unit, seen generally at 28, connected to the servo drive mechanism 24 receives input from an operator and provides a control signal to the servo drive mechanism 24 to position or drive the photosensitive array 20 in accordance with the operator input. As set forth more fully herein, the control unit 28 also connects to and receives an input signal from the photosensitive array 20.

Figures 3, 4:
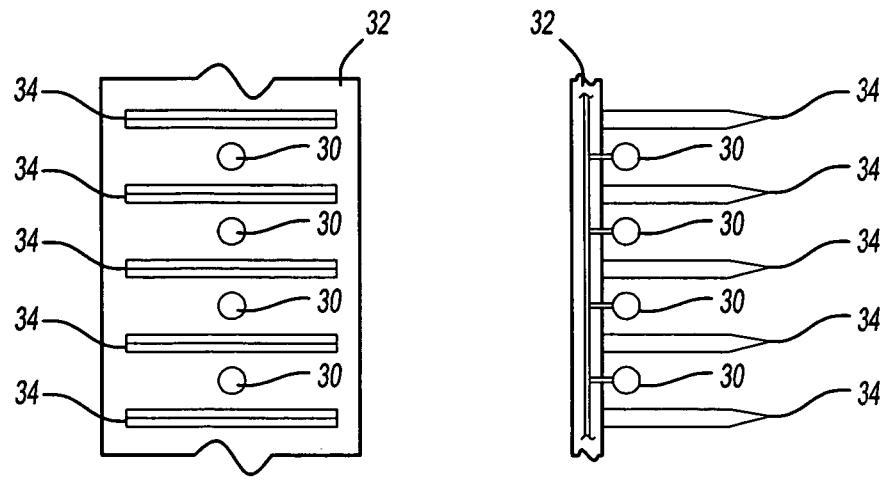
FIG. 3 is a partial front view of a photosensitive array according to the present invention.
FIG. 4 is a partial side view of the photosensitive array of FIG. 3.
Figure 5:
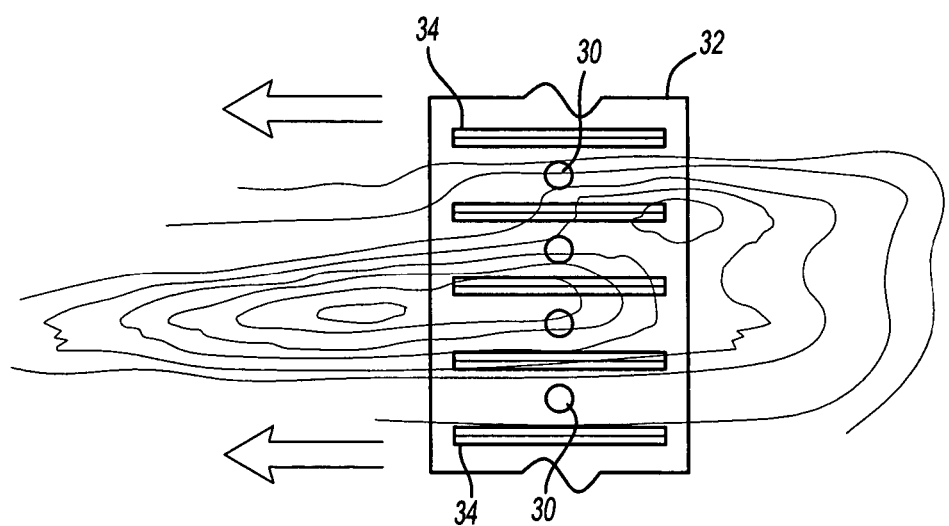
FIG. 5 is a partial front view of a photosensitive array according to the present invention shown schematically moving to record light intensity data.

As shown in FIGS. 3-5, the photosensitive array 20 includes a plurality of photo sensors 30 secured in a linear arrangement or manner to an elongated support member 32. The photo sensors 30 are light sensing devices that emit an electrical signal based upon the intensity of light striking the sensor. In the preferred embodiment, the photo sensors 30 are photo diodes. Other sensors that may be used are photo transistors and photo conductive sensors.

The elongated support member 32 includes a printed-circuit board containing electronic signal processing components enabling filtering and, if necessary, amplification of the signal output of the photo sensors 30. The photo sensors 30 are arranged in a linear fashion and spaced in the preferred embodiment approximately ¼" apart.

The photosensitive array 20 further includes a plurality of baffles 34. The baffles 34 are placed between and separate each of the photo sensors 30. As illustrated in FIG. 4, the baffles 34 extend outwardly from the elongated support member 32 and toward the light source. Typically, the baffles extend outward approximately ¼" to ½" from the elongated support member 32. The baffles 34 operate to keep stray light, such as sunlight or room lights, from striking the photo sensors 30 and affecting the light intensity reading. Thus, they help keep ambient light at a constant and correspondingly reduce its influence.

Accordingly, the photosensitive array 20 is a plurality of photo sensors 30 and baffles 34 secured to an elongated support member 32 depending vertically from the horizontal crossbar 16. The photosensitive array 20 mounts to the frame 16 for horizontally or a side-to-side movement in front of the board 18. Thus, the photosensitive array 20 has the capability to measure the light intensity of a light beam over the entire area of the light beam striking the aim board 18. Specifically, the photosensitive array 20 is long enough to record light intensity data from the top to the bottom of the board 18 and by moving the photosensitive array 20 horizontally it can measure light intensity as it travels from one side of the board 18 to the other.

As indicated above, the control unit 28 controls the position of the photosensitive array 20 and records the output of the photo sensors 30. In the disclosed embodiment, the control unit 28 includes a central processing unit or CPU connected to and receiving the signal from the photosensitive array 20. Accordingly, the light energy measured by the photosensitive array 20, that is data reflecting the electrical signal generated by each of the photo sensors 30 based on the light intensity or amount of light striking each of the photo sensors 30, is recorded and stored in the control unit 20. A series of known algorithms are used to analyze the data and generate light intensity information based on the strength of the electrical signal. A display or screen 36 displays the light intensity information. In addition, the control unit 28, through a keyboard 38, inputs various control or operating parameters used to control the motion of the photosensitive array 20. Further, the control unit 28 includes memory for storage of objective data relating to headlamp types, styles and designs, including illumination patterns or optical prescriptions for use with the aiming process.

The apparatus 10 is capable of operating in several different modes, so that various styles and designs of headlamps can be checked. In use, and as shown in FIG. 1, a vehicle 42 is positioned in a predetermined location 44, typically 25 feet from the apparatus 10. Once the vehicle 42 is properly positioned, the headlamps 40 of the vehicle 42 are energized such that they cast or shine a light beam on the board 18. Suitable information, such as make and model of both the vehicle and the vehicle headlamp are input through the keyboard 38 into the control unit 28. The control unit then operates to move and position the photosensitive array 20 in accordance with a predetermined profile that depends on the style of the headlamps. For visually optical aimable (VOA) style headlamps, the photosensitive array 20 is positioned at predetermined locations to measure the gradient or cutoff of the light beam at specific locations within the beam pattern. Accordingly, when checking the aim of VOA style headlamps, the photosensitive array 20 is fixed or positioned at a predetermined position and the gradient or light intensity is measured to determine whether the headlamp is properly aimed.

VOA headlamps are specifically configured, according to published standards, for each side of the vehicle. A visually optical right headlamp (VOR) has light gradient or cutoff in the beam pattern located 1°-3° right of the headlamp vertical axis and on the horizontal axis of the headlamp. Accordingly, to determine whether a VOR headlamp is properly aimed, the photosensitive array 20 is initially positioned at 2° right of the vertical centerline of the VOR headlamp. The photosensitive array 20 measures the light intensity whereby the location of the light gradient can be determined. Turning to the left side of the vehicle, a visually optical left headlamp (VOL) has a light gradient or cutoff in the beam pattern located 1.5°-3.5° left of the headlamp vertical axis and 0.4° below the horizontal axis of the headlamp. Accordingly, to determine whether a VOL headlamp is properly aimed, the photosensitive array 20 is positioned 2.5° left of the vertical centerline of the VOL headlamp. Again, the photosensitive array 20 measures the light intensity to determine the location of the light gradient. The photosensitive array 20 may be repositioned to check other specific locations within the beam pattern.

Further, the photosensitive array 20 may operate in a scan mode wherein it travels horizontally and obtains light intensity readings across the entire light beam area to determine overall light intensity. These light intensity readings are used to map the beam pattern and create an x-y coordinate representation of the light intensity generated by the particular headlamp. Further, for "hot spot" style headlamps, using the scanning method develops a complete picture of the light intensity of the headlamp enabling an operator to determine the location of and accurately aim the hot spot, or area of greatest light intensity.

Accordingly, using a vertical photosensitive array that travels horizontally enables a scan of the entire area of the board to measure the light intensity of and correspondingly accurately aim any headlamp and any beam pattern.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for measuring the aim location of a vehicle headlamp comprising:
 a board;
 a photosensitive array, said array supported on an elongated member for movement adjacent to and independent of said board, said array including a plurality of photo sensors disposed between a plurality of baffles said baffles configured to allow light from the vehicle headlamp to strike the photo sensors while reducing light from sources other than the headlamp from striking the photo sensors; and
 a control unit connected to and operative to receive input from said plurality of photo sensors.

2. An apparatus for measuring the aim location of a vehicle headlamp as set forth in claim 1 including a crossbar supported adjacent to said board, said array supported for movement on said crossbar.

3. An apparatus for measuring the aim location of a vehicle headlamp as set forth in claim 1 wherein said array depends vertically with respect to said crossbar with said photo sensors arranged on said photosensitive array of such that said photo sensors all lie on a single line with a baffle located between each pair of adjacent photo sensors.

4. An apparatus for measuring the aim location of a vehicle headlamp as set forth in claim 3 wherein said crossbar extends parallel with a longitudinal axis of said board; and
    a drive mechanism coupled to said array, said drive mechanism operative to move said array in the direction of said longitudinal axis.

5. An apparatus for measuring the aim location of a vehicle headlamp as set forth in claim 4 wherein said drive mechanism includes a servo drive mechanism, said servo drive mechanism connected to said control unit whereby said control unit positions said array based on predetermined headlamp aiming and checking requirements.

6. An apparatus for measuring the aim location of a vehicle headlamp as set forth in claim 1 wherein said array includes said photo sensors arranged in a linear manner in a single line, each of said photo sensors spaced from adjacent photo sensors with said baffle located in said space between said adjacent photo sensors with a baffle disposed between adjacent photo sensors; and
    a drive mechanism operative to move said linear array in a direction transverse to a longitudinal axis of said array.

7. An apparatus for measuring the aim location of a vehicle headlamp as set forth in claim 6 wherein said the baffles extend outward in a direction transverse to the longitudinal axis of said array.

8. An apparatus for measuring the aim location of a vehicle headlamp comprising:
    a frame, said frame including a cross member supported on opposite ends thereof by leg members;
    a photosensitive array movably supported on said cross member, said array including a plurality of photo sensors disposed between a plurality of baffles arranged on an elongated support member in a linear fashion, said photo sensors arranged such that they lie in a single line, such that a baffle is placed between and separates each photo sensor and said elongated support member oriented in a direction generally transverse to said cross member;
    a drive mechanism connected to said array, said drive mechanism operative to move said array on said cross member; and
    a control unit, said control unit connected to said drive mechanism and to said array whereby said control unit positions said array and receives input from said photo sensors.

9. An apparatus for measuring the aim location of a vehicle headlamp as set forth in claim 8 including a board, said frame positioned adjacent said board.

10. An apparatus for measuring the aim location of a vehicle headlamp as set forth in claim 8 wherein said photo sensors are capable of measuring light intensity.

11. An apparatus for measuring the aim location of a vehicle headlamp as set forth in claim 8 wherein said baffles extend outward in a direction transverse to a longitudinal axis of said array.

12. An apparatus for measuring the aim location of a vehicle headlamp as set forth in claim 8 wherein said drive mechanism includes a servo drive mechanism, said servo drive mechanism connected to said control unit whereby said control unit positions the array based on predetermined headlamp aiming and checking requirements.

13. An apparatus for measuring the aim location of a vehicle headlamp as set forth in claim 8 wherein said baffles are oriented such that they maintain the ambient light striking said photo sensors at a constant.

14. A method for measuring the aim location of a vehicle headlamp comprising the steps of:
    providing a photosensitive array including a plurality of photo sensors and baffles arranged in a linear fashion, the photosensitive array movably supported on a frame;
    positioning a vehicle at a predetermined position whereby the vehicle headlamps are a predetermined distance from the photosensitive array;
    energizing said vehicle headlamps whereby said headlamps shine a light beam towards said photosensitive array;
    placing said photosensitive array in a position such that said light beam directly strikes said photosensitive array and using said photo sensors of said array to sense the light intensity of at least a portion of the light beam and generating a signal corresponding to the light intensity; and
    using a control unit to record and display an output corresponding to the intensity.

15. The method for measuring the aim location of a vehicle headlamp of claim 14 further comprising the step of positioning the array at a predetermined location to measure the light gradient of the light beam at said predetermined location.

16. The method for measuring the aim location of a vehicle headlamp of claim 14 further comprising the step of moving the array in a manner such that the array scans the light beam and records the light intensity of the light beam.

17. The method for measuring the aim location of a vehicle headlamp of claim 14 further comprising the steps of:
    positioning a board adjacent the array wherein said light beam shines on said board establishing a beam pattern; and
    using said array to measure the light intensity of said beam pattern.

\* \* \* \* \*